UNITED STATES PATENT OFFICE.

MAX BIELEFELDT, OF COSWIG, GERMANY.

HYGROSCOPIC PAINTING.

SPECIFICATION forming part of Letters Patent No. 511,191, dated December 19, 1893.

Application filed May 1, 1893. Serial No. 472,585. (No specimens.)

*To all whom it may concern:*

Be it known that I, MAX BIELEFELDT, doctor of philosophy, a subject of the German Emperor, residing at Coswig, in the Duchy of Anhalt, German Empire, have invented certain new and useful Improvements in Hygroscopic Painting; and I do hereby declare the following to be a full, clear, and exact description of the invention, such as will enable others skilled in the art to which it appertains to make and use the same.

This invention relates to paints or compositions adapted to be applied to the surfaces of packing vessels for the purpose of preserving their contents from the action of moist air.

This invention consists in the novel composition of ingredients hereinafter fully described and claimed.

This composition consists essentially of three ingredients: first, a hygroscopic salt, which is not chemically decomposed by exposure to the atmosphere, such as chloride of calcium, bisulphite of sodium, or the chloride of potassium or magnesium; second, a neutral absorbent powder, such as powdered pumice-stone, infusorial earth or sand; third, a cement, such as glue, silicate of potassium or water-glass. As much of the hygroscopic salt is added to the absorbent material as the latter will take up, and sufficient of the cement is added to the mixture to cause it to adhere to the sides of the receptacle. The exact proportions of the ingredients vary very greatly according to the particular ingredients used, and the nature of the surface to which they are applied. Sometimes the mixture is applied to sheets, or placed between two sheets, of paper or cardboard, and these sheets are used to line the packing vessels instead of the mixture being applied to the sides of the vessels. The hygroscopic salt absorbs the moisture which would otherwise settle on the contents of the vessels. The absorbent material and the cement hold the hygroscopic salt against the vessel in an even layer or coating and prevent it from running down as it liquefies.

The use of this paint is very advantageous when applied to packing boxes temporarily inclosing goods to be shipped from one city to another and which are only a few hours or days in transit, and which are not very much exposed, as the cost of hermetically sealed boxes is saved. In the case of a packing box shipped abroad by water, the paint absorbs the moisture of the air which penetrates through the joints of the box while being shipped and unshipped and at those times very much exposed. While in the hold of a vessel, or in a freight car, the box is less exposed to currents of moist air and very little air passes through it or through its joints.

When chloride of calcium, infusorial earth and glue are used, a good proportion for ordinary use is found in a mixture of about two pounds each of chloride of calcium and glue with about one pound of infusorial earth.

I do not use or claim a salt which is chemically decomposed by exposure to the atmosphere, although it absorbs moisture therefrom, like aluminate of soda. This salt will absorb moisture but it also absorbs carbonic acid gas which decomposes it, forming carbonate of soda and hydrated oxide of aluminum. If such a salt were used the boxes could not be used again after being dried without recoating them.

I am aware that chloride of calcium has been mixed with absorbent material in the manufacture of fire and water resisting paint, other chemicals being added which combined chemically with the chloride of calcium, and I do not claim the same.

What I claim is—

1. A hygroscopic coating for packing vessels, consisting of a mechanical mixture of a hygroscopic salt which is not decomposed by exposure to the atmosphere, a neutral absorbent material, and a cement, in about the proportions set forth.

2. A hygroscopic coating for packing vessels, consisting of a mechanical mixture of chloride of calcium, a neutral absorbent material, and a cement, in about the proportions set forth.

In testimony whereof I affix my signature in presence of two witnesses.

MAX BIELEFELDT.

Witnesses:
W. HAUPT,
A. BIELEFELDT.